(12) United States Patent
Ram et al.

(10) Patent No.: US 11,330,469 B2
(45) Date of Patent: May 10, 2022

(54) INCREASING ACCESS POINT THROUGHPUT BY EXCEEDING A-MPDU BUFFER SIZE LIMITATION IN A 802.11 COMPLIANT STATION

(71) Applicant: Fortinet, Inc., Sunnyvale, CA (US)

(72) Inventors: Mohan Ram, Bangalore (IN);
Sung-Wook Han, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 61 days.

(21) Appl. No.: 15/194,522

(22) Filed: Jun. 27, 2016

(65) Prior Publication Data

US 2016/0381599 A1 Dec. 29, 2016

Related U.S. Application Data

(62) Division of application No. 13/656,408, filed on Oct. 19, 2012, now Pat. No. 9,467,895.

(51) Int. Cl.
| | |
|---|---|
| *H04W 28/06* | (2009.01) |
| *H04L 47/36* | (2022.01) |
| *H04L 5/00* | (2006.01) |
| *H04L 41/22* | (2022.01) |
| *H04L 43/16* | (2022.01) |
| *H04L 69/16* | (2022.01) |
| *H04W 28/14* | (2009.01) |
| *H04W 84/12* | (2009.01) |
| *H04W 28/02* | (2009.01) |

(52) U.S. Cl.
CPC ......... *H04W 28/065* (2013.01); *H04L 5/0055* (2013.01); *H04L 41/22* (2013.01); *H04L 43/16* (2013.01); *H04L 47/365* (2013.01); *H04L 69/161* (2013.01); *H04W 28/14* (2013.01); *H04W 28/0205* (2013.01); *H04W 84/12* (2013.01)

(58) Field of Classification Search
CPC . H04W 28/065; H04W 47/365; H04W 28/14; H04W 28/0205; H04W 84/12; H04L 43/16; H04L 41/22; H04L 5/0055; H04L 69/161; H04L 47/365
See application file for complete search history.

(56) References Cited

U.S. PATENT DOCUMENTS

| | | | | |
|---|---|---|---|---|
| 8,665,906 | B1 * | 3/2014 | Liu | H04B 7/0617 |
| | | | | 370/473 |
| 8,773,969 | B1 * | 7/2014 | Zhang | H04L 27/2602 |
| | | | | 370/208 |

(Continued)

*Primary Examiner* — Un C Cho
*Assistant Examiner* — Yu-Wen Chang
(74) *Attorney, Agent, or Firm* — Law Office of Dorian Cartwright; Dorian Cartwright (57) ABSTRACT

An 802.11-compliant device for high throughput is disclosed. A plurality of TCP packets received in a buffer for transmission are stored. The plurality of TCP packets can be aggregated as A-MSDU sub-frames to form a A-MSDU frame in accordance with an IEEE 802.11 standard. Additionally, a plurality of A-MSDU frames can be aggregated as A-MPDU sub-frames to form a A-MPDU frame. The A-MPDU frame is compliant with a number of allowable sub-frames and a maximum size in accordance with an 802.11 standard. The A-MPDU frame is sent for transmission as an IEEE 802.11 packet.

14 Claims, 7 Drawing Sheets

(56) References Cited

U.S. PATENT DOCUMENTS

| | | | |
|---|---|---|---|
| 2007/0147284 A1* | 6/2007 | Sammour | H04W 74/04 370/328 |
| 2007/0268860 A1* | 11/2007 | Taneja | H04L 27/2608 370/329 |
| 2008/0130538 A1* | 6/2008 | Raissinia | H04W 12/033 370/310 |
| 2008/0192774 A1* | 8/2008 | Singh | H04L 1/1614 370/473 |
| 2010/0027588 A1* | 2/2010 | O'Shea | H04L 1/1614 375/147 |
| 2010/0157966 A1 | 6/2010 | Sugar et al. | |
| 2011/0019557 A1* | 1/2011 | Hassan | H04L 47/14 370/252 |
| 2011/0096685 A1 | 4/2011 | Lee et al. | |
| 2011/0134816 A1* | 6/2011 | Liu | H04L 1/06 370/310 |
| 2011/0149880 A1* | 6/2011 | Gong | H04W 72/1221 370/329 |
| 2011/0280232 A1* | 11/2011 | Wu | H04W 28/06 370/338 |
| 2012/0008568 A1 | 1/2012 | Gong et al. | |
| 2012/0134362 A1 | 5/2012 | Itagaki et al. | |
| 2012/0170507 A1 | 7/2012 | Sawai | |
| 2012/0177020 A1* | 7/2012 | Chou | H04W 76/20 370/338 |
| 2013/0064194 A1* | 3/2013 | Christin | H04L 47/10 370/329 |
| 2013/0094440 A1* | 4/2013 | Moshfeghi | H04L 5/0032 370/328 |
| 2013/0202025 A1* | 8/2013 | Baron | H04N 21/2385 375/240.02 |
| 2013/0242940 A1 | 9/2013 | Jones et al. | |
| 2014/0079016 A1 | 3/2014 | Dai et al. | |
| 2017/0104569 A1* | 4/2017 | Chandra | H04L 5/0055 |

* cited by examiner

INCREASING ACCESS POINT THROUGHPUT BY EXCEEDING A-MPDU BUFFER SIZE LIMITATION IN A 802.11 COMPLIANT STATION

CROSS-REFERENCE TO RELATED APPLICATIONS

This application is a divisional of U.S. patent application Ser. No. 13/656,408 filed Oct. 19, 2012, entitled INCREASING ACCESS POINT THROUGHPUT BY EXCEEDING A-MPDU BUFFER SIZE LIMITATION IN A 802.11 COMPLAINT STATION by Mohan Ram et al., the content of which is incorporated herein by reference in its entirety.

FIELD OF THE INVENTION

The invention relates generally to computer networking, and more specifically, to exceeding A-MPDU buffer size limitation in an 802.11 compliant station.

BACKGROUND

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the protocols are widely adopted in wireless devices such as laptop computers, tablet computers, smart phones, and network appliances.

Wireless devices complying with standards such as IEEE 802.11ac increases the maximum bandwidth capability for wireless networks relative to IEEE 802.11n. Increased bandwidth allows an individual access point or mobile station to potentially send and receive data at a higher rate. In particular, IEEE 802.11ac increases the maximum payload for a packet of IEEE 802.11n from 64 kbyte to 1 Mbyte.

Problematically, there is currently no technique to utilize the full capacity of 1 Mb transmission capacity. Current aggregation technologies under IEEE 802.11n are able to combine up to 64 packets, each of which carries a payload of typically 1,500 bytes but not exceeding 2304 bytes. However, many packets have little or no payloads (e.g., service packets). Even if all 64 packets carried a maximum payload, the total of 147 kbyte utilizes the maximum capacity under the previous IEEE 802.11n standard, but is consumes less than 15% of the newer IEEE 802.11ac standard.

What is needed is a robust technique to optimize more of the payload capacity offered by IEEE 802.11ac and similar standards by aggregating payloads.

SUMMARY

To meet the above-described needs, methods, computer program products, and systems to exceed a A-MPDU buffer size limitation in a 802.11 compliant device.

In one embodiment, a plurality of TCP or UDP packets received in a buffer for transmission are stored. The plurality of TCP packets can be aggregated as MSDU sub-frames to form a A-MSDU frame in accordance with an IEEE 802.11 standard. Additionally, a plurality of A-MSDU frames can be aggregated as MPDU sub-frames to form a A-MPDU frame. The A-MPDU frame is compliant with a number of allowable sub-frames and a maximum size in accordance with an 802.11 standard. The A-MPDU frame is sent for transmission as an IEEE 802.11 packet.

Advantageously, a wireless network can improve throughput by optimizing channel utilization, effective payload size and packet overhead.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems to exceed a A-MPDU buffer size limitation in a 802.11 compliant device are disclosed. For the purposes of illustration only, the disclosure details an exemplary implementation operating in accordance with IEEE 802.11ac, although any suitable standard or customized protocol can be substituted. In further detail, TCP or UDP packets are combined into a A-MSDU frame, and A-MSDU frames are combined into a A-MPDU frame, but any type of network packet can be configured according to the disclosure herein. Generally, the below description includes preferred embodiments as non-limiting examples.

Figure 1A:
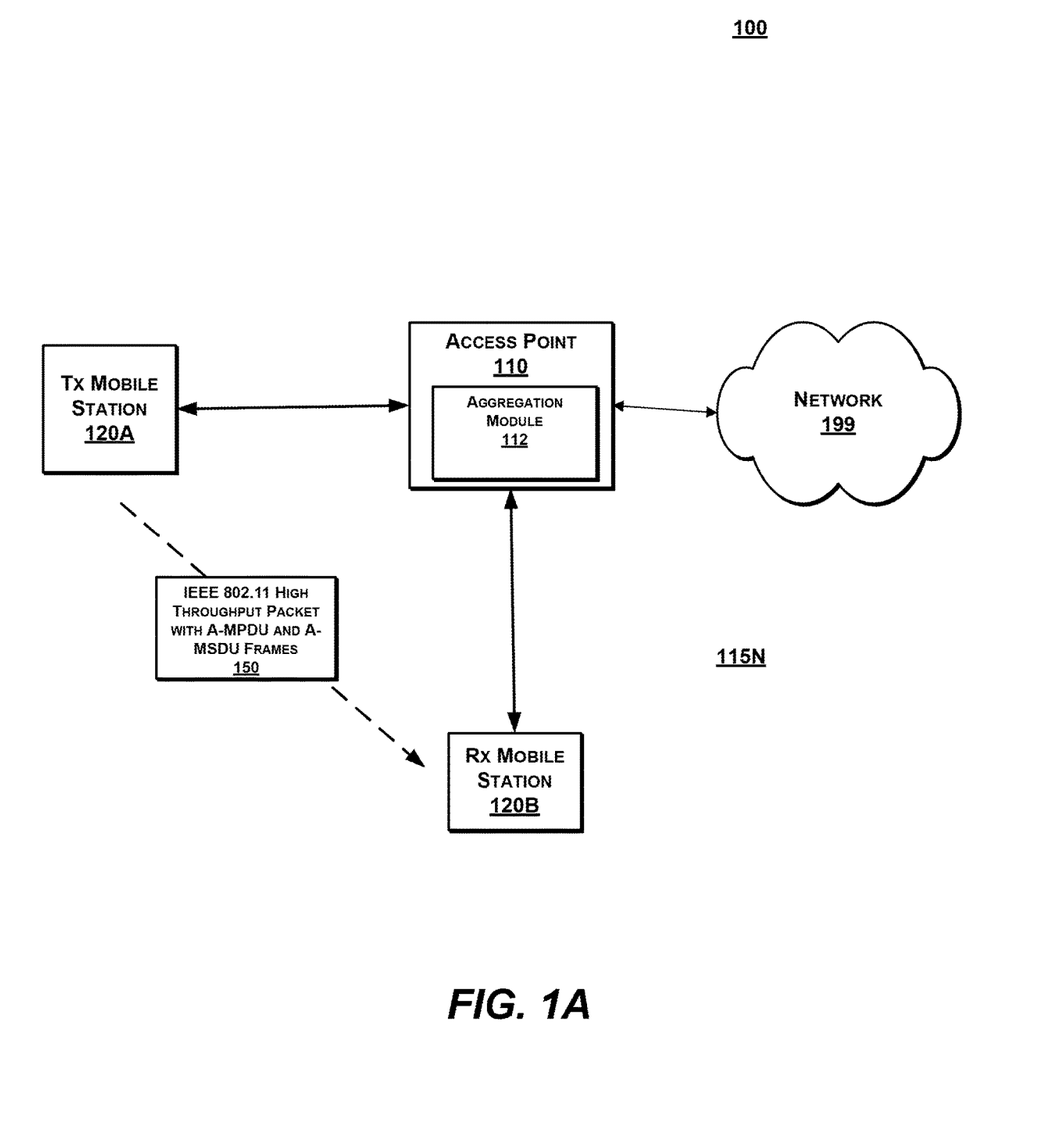
FIG. 1A is a high-level block diagram illustrating a distributed system to exceed a A-MPDU buffer size limitation, according to one embodiment.
Figure 1B:
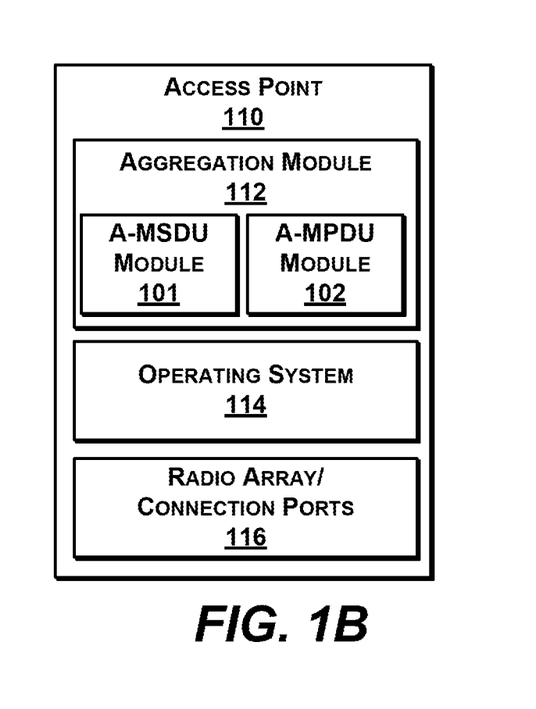
FIG. 1B is a more detailed block diagram illustrating an access point of the system of FIG. 1A, according to one embodiment.
Figure 1C:
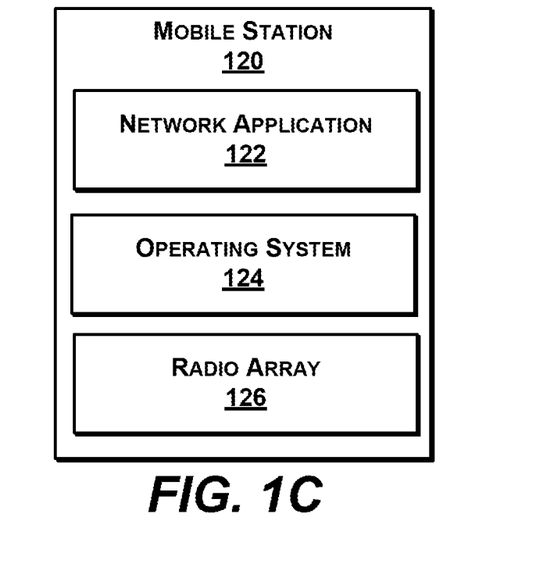
FIG. 1C is a more detailed block diagram illustrating a mobile stations of the system of FIG. 1A, according to one embodiment.

FIGS. 1A-1C

FIG. 1A is a high-level block diagram illustrating a distributed system 100 to exceed a A-MPDU buffer size limitation, according to one embodiment. The system 100 includes access point 110 coupled to stations 120A, 120B, and also coupled to network 199. At a high level, an access point 110 combines network packets received from a transmitting station 120A, and sends an aggregated network packet to a receiving station 120B. Other embodiments of the system 100 can include additional network components that are not shown in FIG. 1A. For example, there can be multiple access points, and there could be a controller in communication with each of the multiple access points. There can be numerous mobile stations or just one. There can also be switches, routers, fire walls, proxy servers, and the like.

Figure 6:
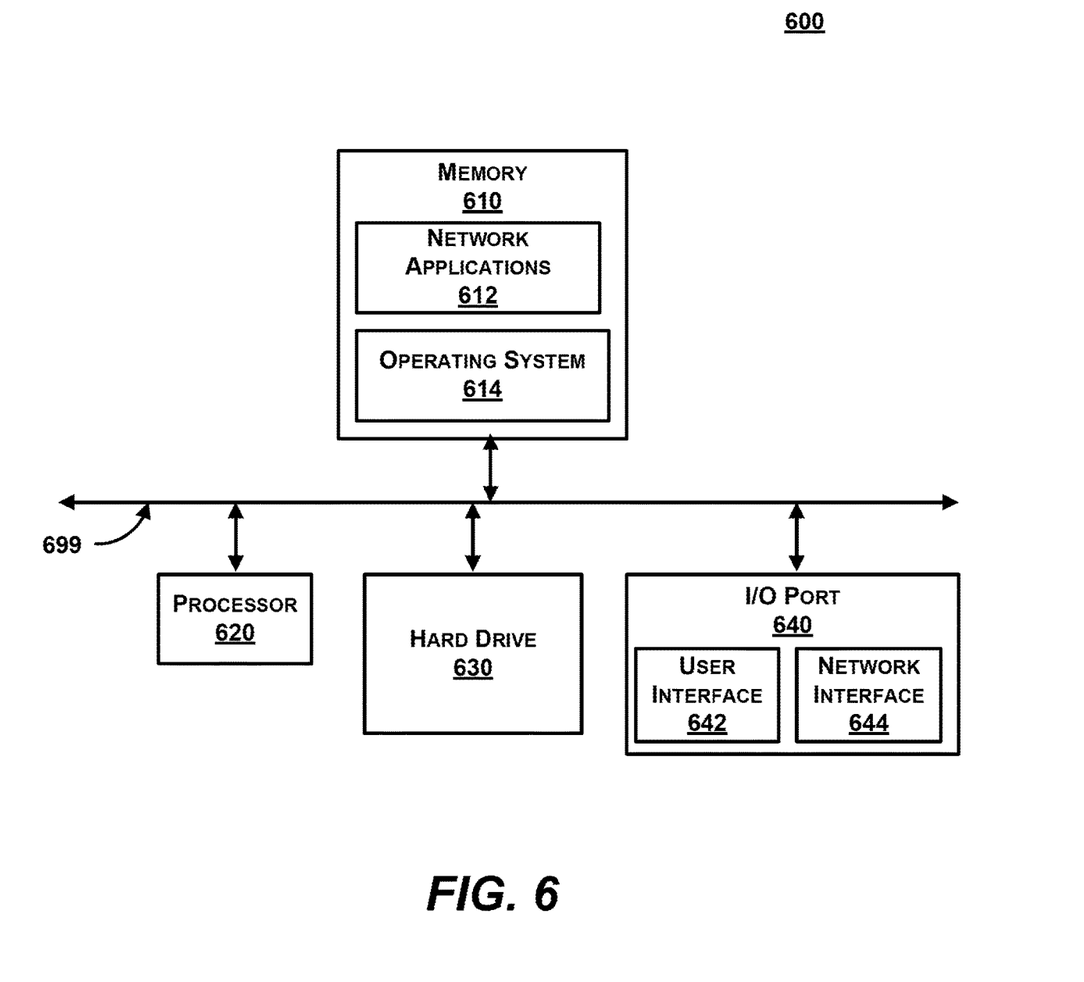
FIG. 6 is a block diagram illustrating an exemplary computing device, according to one embodiment

The access point 110 can be any of the computing devices, such as a personal computer, a server blade, any computing environment as shown in FIG. 6. For example, the access point 110 can be an AP 110 or AP 433 (modified as discussed herein) by Meru Networks of Sunnyvale, Calif. Each access point 110 is preferably connected to the network 199 (or to a switch, router, hub, or another access point that is connected to the network 199) via a wired or wireless connection. The access point 110 can be set-up in various configurations to provide wireless coverage areas. In one embodiment, the functionality is incorporated into a switch or router, and in another embodiment, is incorporated into a custom enclosure. In operation, the access point 110 transmits network packets from a transmitting mobile station 120A to a receiving mobile station 120B, or transmits network packets between any components on the Internet that are in communication with mobile stations within range. In some embodiments, the access point 110 exceeds a A-MPDU buffer size limitation by combining A-MSDU network packets into a A-MPDU network packet. Additional embodiments of the access point 110 are set forth below in FIG. 1B.

The stations 120A-120B can be, for example, a personal computer, laptop computer, tablet computer, smart phone, mobile computing device, Internet appliance, end station or any other computing device as described in FIG. 6. (Although designated in FIG. 1A as transmitting and receiving stations 120A,120B, this is just a temporary state that can reverse or change between mobile stations over time, so the generic designation of mobile station 120 is also used herein.) The stations 120A-B can be wirelessly coupled to an access point. No pre-configuration or client is needed. The stations 120A-120B operate according to wireless standards such as IEEE 802.11a, b, g, n, ac or any other wireless standard. The mobile station 120 sends and/or receives network packets as data for applications running on the mobile stations. Further, the stations 120A-B can send and/or receive aggregated MSDU network packets. Embodiments of the stations 120A-B are discussed in more detail below in association with FIG. 1C.

In an additional embodiment of the system 100, a controller in the network architecture is in communication with each of multiple access points (e.g., an MC1500 or MC6000 device by Meru Networks of Sunnyvale, Calif.). As a result, the controller can provide a virtual port to a mobile station within a domain. The virtual port uses a unique BSSID for each mobile station to control the mobile station in relation to the network. Additionally, the controller can provide a virtual cell to a mobile station over the domain. The virtual cell uses a common BSSID across multiple access points (shared or unique BSSIDs) to present seamless transitions across the network. Advantageously, the controller can manage aggregate network packets with respect to individual transactions and with respect to each mobile device while moving around a network.

FIG. 1B is a more detailed block diagram illustrating the access point 110 of FIG. 1A, according to one embodiment. The access point 110 comprises an aggregation module 112, an operating system 114 and a radio array 116. The components can be implemented in hardware, software, or a combination of both.

The aggregation module 112 further includes an A-MSDU module 101 and an A-MPDU module 102. The aggregation module 112 can be stand-alone, or integrated with, for example, the operating system 114. The A-MSDU module 101 determines when MSDU aggregation of sub-frames is appropriate, and processes the aggregation. The A-MPDU module 102 determines when MPDU aggregation of sub-frames is appropriate, and processes the aggregation. In some embodiments, the aggregation module 112 provides an application level or administrator level control to activate aggregation.

The operating system 114 interfaces between the software and hardware of the access point 110. The operating system 114 can also include integrated applications. When aggregation is active in the aggregation module 112, the operating system 114 can provide support indirectly through configurations and settings, or directly through interactions with protocol software such as a TCP server or OSI functionality.

The radio array/connection ports 116 represent physical access to communication channels or mediums. A radio array can include one or more transmit (Tx) and receive (Rx) antennas for communication with the physical layer. Some mobile stations 110 include separate antennae for IEEE 802.11a, IEEE 802.11b, IEEE 802.11n, and IEEE 802.11ac. Other mobile stations 110 include several antenna dedicated for separate transmit and receive paths using the MIMO functionality of IEEE 802.11ac. Antennae can be tuned for IEEE 802.11 transmissions. An Ethernet port can allow plug-in connections to a wired medium using a RJ-45 jack, or the like.

FIG. 1C is a more detailed block diagram illustrating either of the stations 120A, B of the system of FIG. 1A, according to one embodiment. The station 120 comprises a network application 122, an operating system 124, and a radio array 126. The components can be implemented in hardware, software, or a combination of both.

The network application 122 can be any application executing on the mobile station 110 that makes use of network access in operation. Examples of the network application 122 include a network browser, a VOIP telephone service, a streaming video player, a database viewer, a VPN client, and the like.

The operating system 124 is responsible for connecting to a communication channel for data exchange, among other tasks. To do so, the operating system 124 listens for beacons broadcast by access points, and generates a probe request to connect to a selected access point. After connecting, the operating system 124 exchanges data packs and unpacks data packets in accordance with, e.g., a TCP/IP stack. More particularly, IEEE 802.11-type packets (e.g., IEEE 802.11ac packets) can be generated and received.

The radio array 126 includes one or more transmit (Tx) and receive (Rx) antennas for communication with the physical layer, as described above in association with radio array/connection ports 116.

Figure 2:
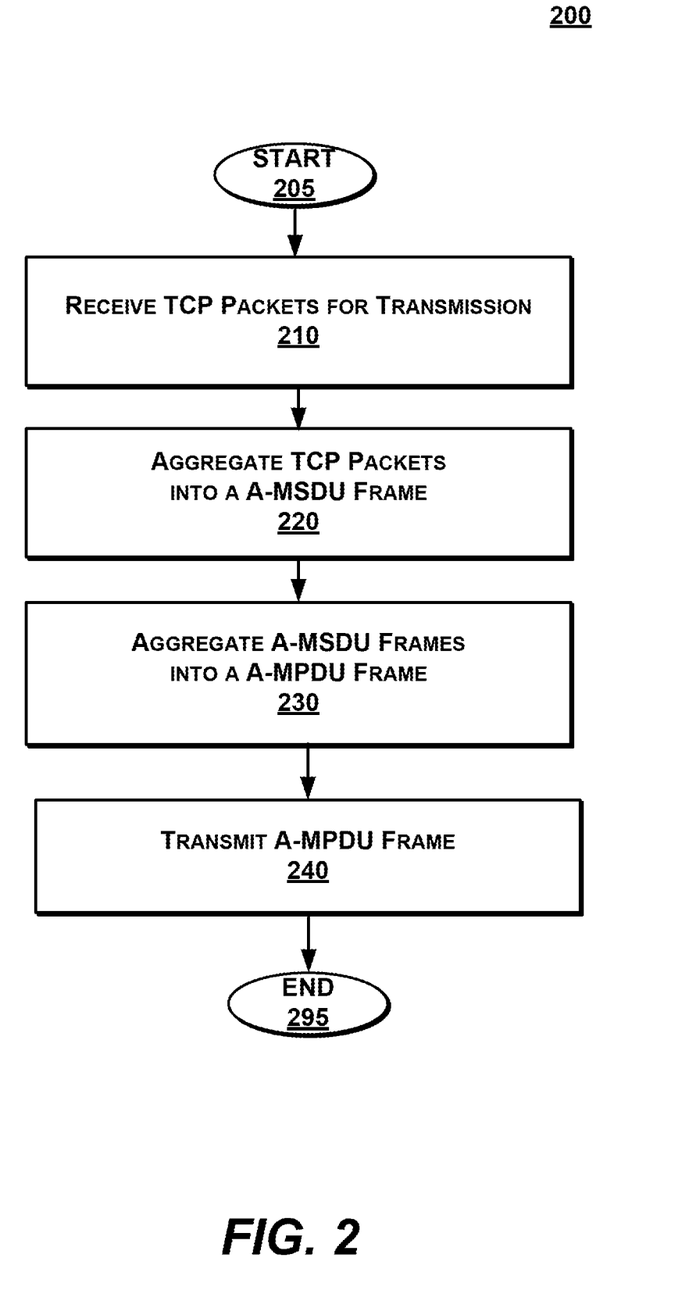
FIG. 2 is a block diagram illustrating a method for exceeding a A-MPDU buffer size limitation, according to one embodiment.

FIG. 2

FIG. 2 is a block diagram illustrating a method 200 for exceeding a A-MPDU buffer size limitation, according to one embodiment. Although the method 200 is shown from point of view of an access point, the same process can be applied to transmissions from a mobile station.

At step 210, TCP (or UDP) packets are received for transmission. The TCP packets are received from one or more end stations such as a mobile station, server, or other access point. The access point acts as an intermediary by passing packets to and from mobile stations within range and other network components. In one embodiment, the TCP/IP packets are initially received by a mobile station encapsulated in an IEEE 802.11 packet, an IEEE 802.3 packet, a synchronized network packet, or the like. An encapsulated TCP packet is isolated by removing header data and other parts of the IEEE 802.11 network packet. Several packets can be queued until processed. However, A-MPDU aggregation is limited to 64 packets.

At step 220, TCP packets are aggregated into an A-MSDU frame. An aggregation module (e.g., as described above, or a modified TCP server) can analyze the queued packets and determine whether to aggregate packets for higher throughput. Conditions for aggregation (i.e., dual aggregation) can include same transmitter, same receiver or same QoS (Quality of Service). Stricter conditions may be enforced for one or more intermediate hops over a network path, although the originating source and ultimate destination need not be the same across the entire network path (e.g., MAC addresses of a hop can be the same, while end-to-end IP addresses differ). In one case, aggregation is initiated or requested at an application level by an application needing high throughput. In another case, aggregation is initiated at an operating system level in which a network manager determines that network conditions are appropriate. In still another case, composition of queued packets can be analyzed for type and/or length, and aggregated if a threshold number of type (e.g., ACK or other control packet) or length (e.g., empty or small payload) of packets are present. Aggregation can be dynamically turned on and off in accordance with composition.

Up to 5 TCP packets are combined into a single A-MSDU frame that remains IEEE 802.11ac protocol-compliant. The individual TCP packets can be numbered as sub-frames. Many access points operating under IEEE 802.11 use IEEE 802.3 as a native frame format for MSDU aggregation. In other embodiments, more or less than 5 TCP packets are combined in accordance with various protocols. If needed, a TCP packet can be divided among several A-MSDU frames.

At step 230, A-MSDU frames are aggregated into an A-MPDU frame. In one embodiment, an IEEE 802.11ac transmission channel is detected between the IEEE 802.11 compliant device and a second device (e.g., by a detection module). Responsive to the detection, an access point is switched to a high throughput mode with A-MSDU and A-MPDU frame aggregation. For aggregation, MSDU frames are queued by an MPDU buffer, or alternatively, pointers to MSDU data in a TCP buffer or other buffer are passed to an MPDU aggregator. The MPDU queue can combine 64 packets for up to 1 Mb of data, in accordance with some IEEE 802.11 protocols. The individual A-MSDU frames can be numbered as A-MPDU sub-frames. Because A-MPDU sub-frames with aggregated TCP packets appears as a single packet, up to 64 aggregated A-MPDU sub-frames can be combined in a protocol-compliant A-MPDU frame. The MPDU frame is encapsulated into an IEEE 802.11 packet by adding a physical layer header. Again, other embodiments include more or less than 64 MSDU frames and remain within size limits in accordance with other protocols. For standards in which large packets would exceed a total data size, a number of packets or size of aggregated packets can be controlled to maintain compliance. Some embodiments, an MSDU frame can be divided over one or more MPDU frames.

At step 240, the aggregated A-MPDU frame is transmitted as an IEEE 802.11 packet. To do so, the A-MPDU frame is first encapsulated along with physical layer headers into a network packet.

Figure 3:
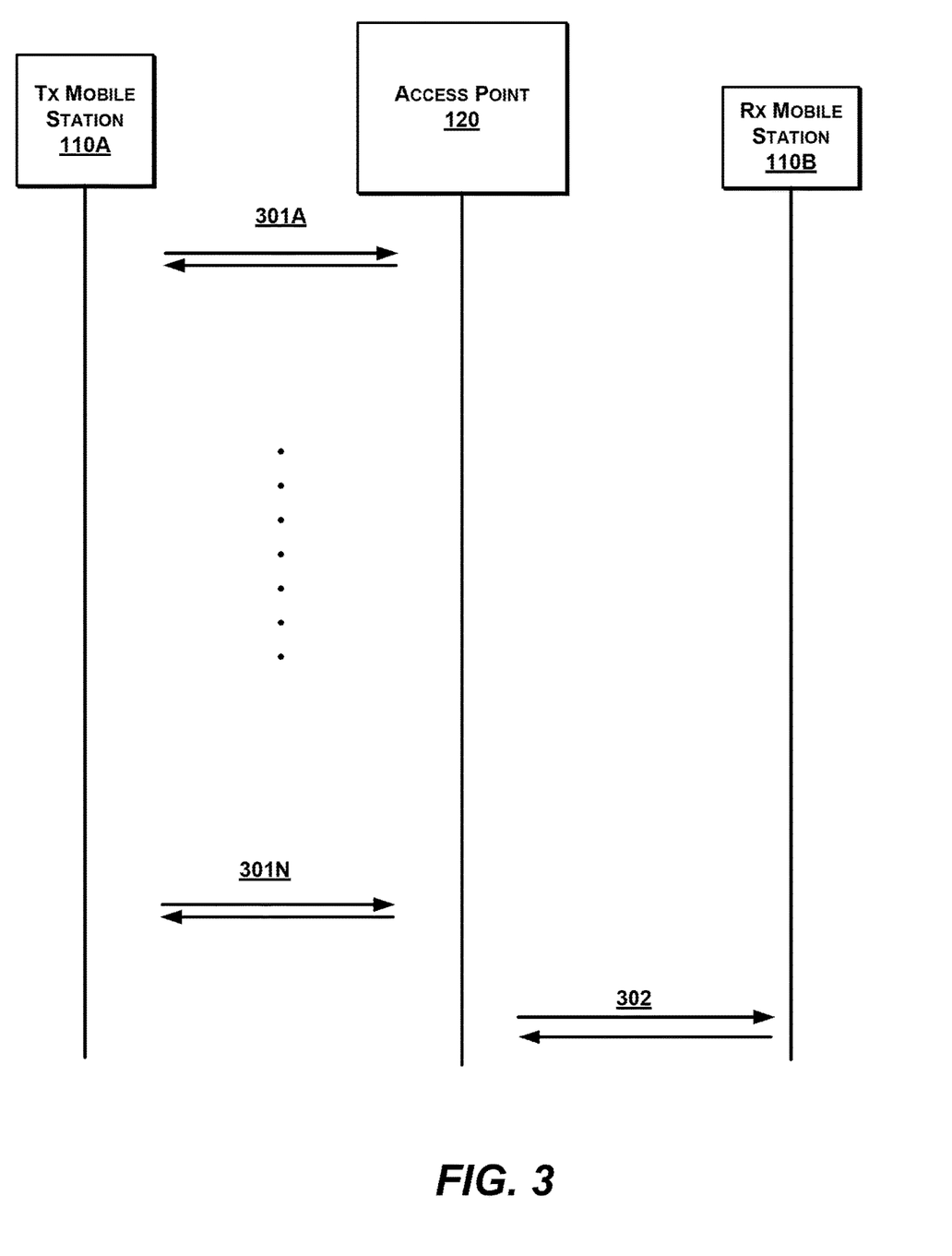
FIG. 3 is a schematic diagram illustrating interactions between components to exceed a A-MPDU buffer size limitation, according to one embodiment.

FIG. 3

FIG. 3 is a schematic diagram illustrating interactions between components to exceed an A-MPDU buffer size limitation, according to one embodiment. A transmitting mobile station 120A (or mobile stations) sends traditional IEEE 802.11 packets over a network to an access point 110 to a receiving mobile station 120B.

Each IEEE 802.11 packet is acknowledged by the access point 110 to the transmitting mobile station. The access point processes the IEEE 802.11 packets as described more fully below in association with FIGS. 4A-B. Ultimately, a modified IEEE 802.11 packet having MPDU frames of aggregated A-MSDU frames, and A-MSDU frames with aggregated TCP packets, is sent to the receiving station 120B.

In response to the modified IEEE 802.11 packet, a single, block acknowledgment is sent from the receiving station 120B to the access point 110. If an acknowledgment is not received after a timeout, or if errors are detected, the modified IEEE 802.11 packet can be resent. In some cases, multiple errors in transmission can result in the de-aggregation and transmission of conventional packets.

Figure 4A:
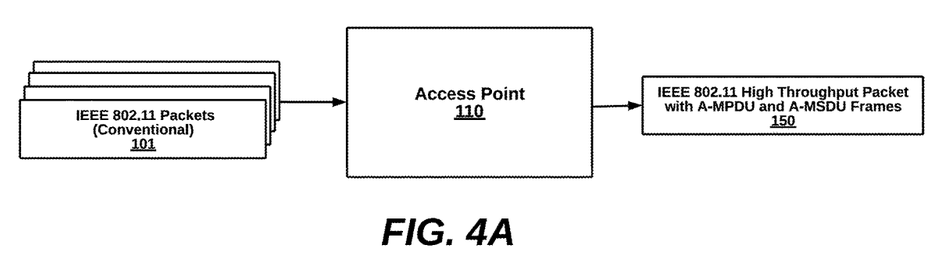
FIGS. 4A-4B are schematic diagrams illustrating packet aggregation relative to OSI (Open System Interconnection) reference protocol layers, according to one embodiment.
Figure 4B:
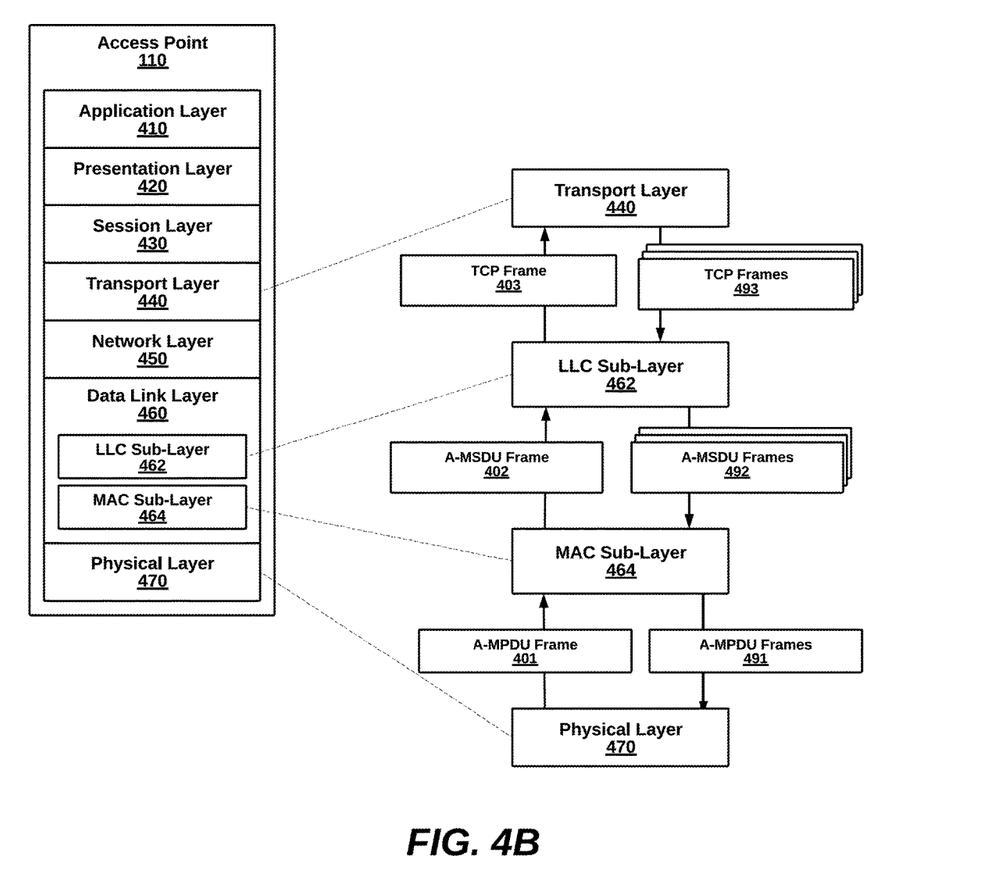

FIGS. 4A-4B

FIGS. 4A-4B are schematic diagrams illustrating packet aggregation relative to OSI (Open System Interconnection) reference protocol layers, according to one embodiment. At a high level, a multiple, conventional IEEE 802.11 packets are input to an access point, and a modified IEEE.802.11 packet with aggregate A-MPDU and MSDU frames is output, as shown in FIG. 4A.

From an internal perspective, packets are processed in accordance with the OSI reference protocol layers, as shown in FIG. 4B. The layers serve as a reference model for abstracted processes rather than a strict segregation of processes. The incoming process shows an incoming packet is stripped of header information relevant to a particular layer as it is passed up to a higher layer. Specifically, an IEEE 802.11 packet is unwrapped to expose a TCP packet. By contrast, the outgoing process shows outgoing packets that are combined and formatted while being passed down to a lower layer. Generally, multiple TCP packets are combined into a A-MSDU frame, which in turn, are combined into a A-MPDU frame that can be sent as a modified IEEE 802.11 packet.

Packets are received from and transmitted to a channel, or physical medium, by a physical layer 470. The physical layer modulates digital data to analog symbols transmitted by radio antennae, or copper wire, for example. The physical layer 470 also demodulates received analog data. These operations occur without regard to the specifications of the upper layers. The physical layer 470 operates according to, for example, IEEE 802.11 standards regulating signal strength, timing, data rates, maximum transmission distances, and the like.

The data link layer 460 is responsible for reliable transit of data across the physical link. The data link layer 460 includes the MAC sub-layer 464 and the LLC sub-layer 462. The MAC sub-layer 464 provides and confirms physical addressing, or a MAC address, in accordance with the IEEE 802.11 or IEEE 802.3 protocol. The MAC address can be a 48-bit address expressed as 12 hexadecimal digits, to uniquely identify a network interface to a mobile station. Some mobile stations utilize multiple network interfaces, and thereby have multiple, independent MAC addresses. In one embodiment, the MAC sub-layer 464 combines A-MSDU frames into a single aggregated packet, or unpacks A-MSDU frames from a received aggregated packet. Additionally, the LLC sub-layer 462 provides SAPs (Service Access Points) and flow control independent of a media access protocol and an IP protocol. In one embodiment, the LLC sub-layer combines TCP packets into a single A-MSDU frame, or unpacks A-MSDU frames from a received aggregated packet.

The transport layer 440 provides reliable data transport between devices for one or more applications. In some embodiments, applications can be part of a so-called operating system. A flow control feature improves reliability by slowing down or stopping data delivery based on buffer capacity. In other words, as a buffer fills up due to packets being received faster than processed by upper layers, or if packets are not being acknowledges by a receiving device, the transport layer can alleviate the back-ups by, for example, temporarily suspending data transmission.

Figure 5:
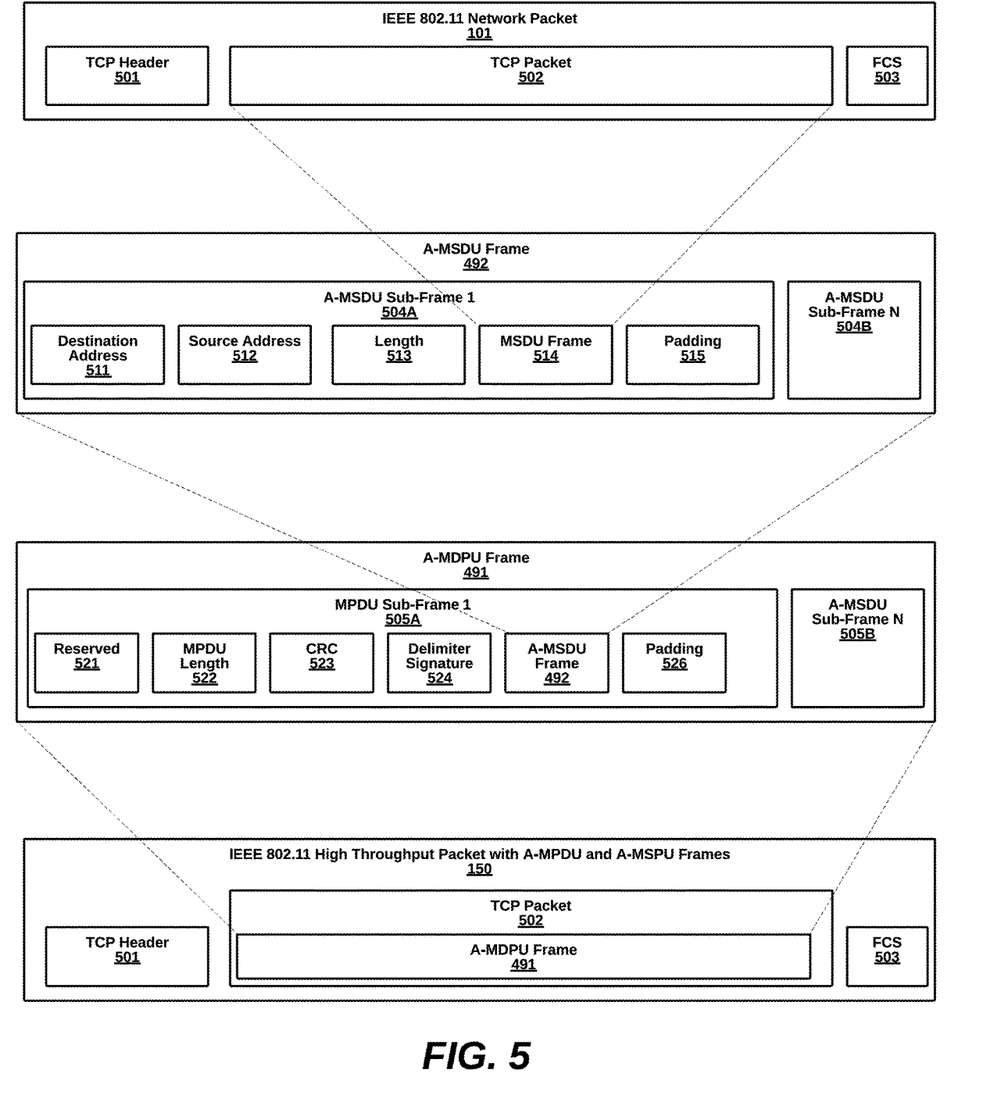
FIG. 5 is a block diagrams illustrating packet formats, according to one embodiment.

FIG. 5

FIG. 5 is a block diagram illustrating packet formats, according to one embodiment. An initial IEEE 802.11 packet 101 includes a TCP (or UDP) packet 502 along with a (physical layer) header 501. The TCP packet 502 can hold up to 1,500 bytes in some embodiments. The TCP packet 502 can include a TCP header (not shown) with fields for frame control, duration/ID, address, sequence control, and the like. The frame control field can include fields for protocol version, type, subtype, to DS, from DS, more fragments, retry, power management, WEP, order, and the like. Additionally, an FCS 503 (Frame Check Sequence) ensures data integrity.

An A-MSDU 409 frame can include a data as MSDU sub-frames 504A, B and header data. The data packet was increased to nearly 8 k, or more precisely, 7,935 bytes under IEEE 802.11n and 802.11ac. The header data can include fields for a destination address 511, source address 512, length 513 and padding 515.

An A-MPDU frame 491 includes MPDU sub-frames 505A, B and header data. The A-MPDU frame 491 can be hold up to 1 Mb under the IEEE 802.11ac standard. Under the technique described herein, 64 packets of up to 7,935 bytes accounts for about 480 kb, well within the limit. Other fields can include reserved 521, MPDU length 522, CRC 523, delimiter signature 524 and padding 526. MPDU.

Finally, an IEEE 802.11 high throughput packet with A-MPDU and A-MSDUMSDU frames 150 is composed of a (A-MPDU PHY) header 501, a A-MPDU frame 491 and an FCS 503, similar to IEEE 802.11 network packet 101. However, the TCP packet 502 has been replaced with the A-MPDU frame 491 and any supporting data needed. In symbolic form, IEEE802.11 High Throughput Packet={header, A-MPDU} where A-MPDU={A-MSDU1, A-MSDU2 . . . , A-MSDUn} where A-MSDU(i)={{DA, SA, TCP Packet1, Padding}, {DA, SA, TCP Packet2, Padding}, . . . {{DA, SA, TCP Packetn, Padding}}. MPDU.

FIG. 6

FIG. 6 is a block diagram illustrating an exemplary computing device 600 for use in the system 100 of FIG. 1A, according to one embodiment. The computing device 600 is an exemplary device that is implementable for each of the components of the system 100, including the access point 110, and the mobile stations 120A, 120B. Additionally, the computing device 600 is merely an example implementation itself, since the system 100 can also be fully or partially implemented with laptop computers, tablet computers, smart cell phones, Internet appliances, and the like.

The computing device 600, of the present embodiment, includes a memory 610, a processor 620, a storage device 630, and an I/O port 640. Each of the components is coupled for electronic communication via a bus 699. Communication can be digital and/or analog, and use any suitable protocol.

The memory 610 further comprises network applications 612 and an operating system 614. The network applications 620 can include the modules of network applications or access points as illustrated in FIGS. 6 and 7. Other network applications can include 612 a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor or central processing unit (CPU), an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method for exceeding A-MPDU buffer size limitation in a IEEE 802.11 compliant device, comprising:
   storing a plurality of TCP packets or UDP packets received in a buffer for transmission;
   transmitting the plurality of TCP packets or UDP packets in a normal mode;
   dynamically determining to aggregate the plurality of TCP packets or UDP packets based on an analysis of the plurality of TCP or UDP packets currently stored in the buffer for a threshold number of type of packets and length of packets;
   receiving a request from an application needing high throughput;
   detecting an IEEE 802.11ac transmission channel between the IEEE 802.11 compliant device and a second device;
   responsive to the detection, switching to a high throughput mode with A-MSDU and A-MPDU frame aggregation, comprising:
      aggregating the plurality of TCP packets as A-MSDU sub-frames to form a A-MSDU frame in accordance with an IEEE 802.11 standard;
      aggregating a plurality of A-MSDU frames as A-MPDU sub-frames to form a A-MPDU frame, wherein the A-MPDU frame is compliant with a number of allowable sub-frames and a maximum size in accordance with an IEEE 802.11 standard; and
      sending the A-MPDU frame for transmission as an IEEE 802.11 packet;
   detecting that errors in IEEE 802.11ac transmission channel between the IEEE 802.11 compliant device and a second device exceed a threshold of tolerance; and
   responsive to the detection, switching away from the high throughput mode with A-MSDU and A-MPDU frame aggregation.

2. The method of claim 1, wherein the TCP network packet is received as part of an IEEE 802.11 packet.

3. The method of claim 1, wherein the number of frames allowed inside a buffer is 64.

4. The method of claim 1, further comprising:
   generating an 802.11ac frame from the A-MPDU network packet for transmission from an 802.11ac compliant device.

5. The method of claim 1, further comprising:
   receiving a block acknowledgment in response to the A-MPDU network packet sent.

6. The method of claim 1, wherein a maximum size for a data packet of a TCP network packet is 2,304 bytes.

7. The method of claim 1, wherein the 802.11ac compliant device comprises one of: an access point, a router, a switch, and a mobile station.

8. The method of claim 1, wherein aggregating the plurality of TCP packets as A-MSDU sub-frames to form a A-MSDU frame in accordance with an IEEE 802.11 standard:
   aggregating five of the plurality of TCP packets as A-MSDU sub-frames to form a A-MSDU frame in accordance with the IEEE 802.11ac standard.

9. The method of claim 1, wherein aggregating a plurality of A-MSDU frames as A-MPDU sub-frames to form a A-MPDU frame, wherein the A-MPDU frame is compliant with a number of allowable sub-frames and a maximum size in accordance with an 802.11 standard:
   aggregating 64 of a plurality of A-MSDU frames as A-MPDU sub-frames to form a A-MPDU frame, wherein the A-MPDU frame is compliant with a number of allowable sub-frames and a maximum size in accordance with the IEEE 802.11ac standard.

10. The method of claim 1, wherein the plurality of TCP network packets have at least one of:
    more than one source and more than one destination.

11. The method of claim 1, further comprising:
    providing a graphical user interface for user-level toggling between a high throughput mode which aggregates A-MSDU network packets, and a normal mode which does not aggregate A-MSDU network packets.

12. The method of clam 1, wherein the plurality of TCP packets or UDP packets comprises a plurality of TCP packets and UDP packets.

13. A non-transitory computer-readable medium storing instructions that, when executed by a processor, perform a method for exceeding A-MPDU buffer size limitation in a 802.11 compliant device, comprising:
    storing a plurality of TCP packets or UDP packets received in a buffer for transmission;
    transmitting packets in a normal throughput mode;
    dynamically determining to aggregate the plurality of TCP packets or UDP packets based on an analysis of the plurality of TCP or UDP packets currently stored in the buffer for a threshold number of type of packets and length of packets;
    receiving a request from an application needing high throughput;
    detecting an IEEE 802.11ac transmission channel between the IEEE 802.11 compliant device and a second device;
    responsive to the detection, switching to a high throughput mode with A-MSDU and A-MPDU frame aggregation, comprising:
       aggregating the plurality of TCP packets as A-MSDU sub-frames to form a A-MSDU frame in accordance with an IEEE 802.11 standard;
       aggregating a plurality of A-MSDU frames as A-MPDU sub-frames to form a A-MPDU frame, wherein the A-MPDU frame is compliant with a number of allowable sub-frames and a maximum size in accordance with an IEEE 802.11 standard; and
       sending the A-MPDU frame for transmission as an IEEE 802.11 packet;

detecting that errors in IEEE 802.11ac transmission channel between the IEEE 802.11 compliant device and a second device exceed a threshold of tolerance; and responsive to the detection, switching away from a high throughput mode with A-MSDU and A-MPDU frame aggregation.

14. A system with an 802.11 compliant device that exceeds A-MPDU buffer size limitation in a 802.11 compliant device, the device comprising:

a processor; and a memory, comprising:
  a buffer to store a plurality of TCP packets received in the buffer for transmission;
  a transmission module to transmit the plurality of TCP packets or UDP packets in a normal throughput mode;
  an aggregate control module to dynamically determine to aggregate the plurality of TCP packets or UDP packets based on an analysis of the plurality of TCP or UDP packets currently stored in the buffer for a threshold number of type of packets and length of packets;
  a receiving module to receive a request from an application needing high throughput;
    a detection module to detect an IEEE 802.11ac transmission channel between the IEEE 802.11 compliant device and a second device, and responsive to the detection, switch to a high throughput module with A-MSDU and A-MPDU frame aggregation;
  an MSDU aggregating module to aggregate the plurality of TCP packets as A-MSDU sub-frames to form a A-MSDU frame in accordance with an IEEE 802.11 standard;
  an MPDU aggregating module to aggregate a plurality of A-MSDU frames as A-MPDU sub-frames to form a A-MPDU frame, wherein the A-MPDU frame is compliant with a number of allowable sub-frames and a maximum size in accordance with an IEEE 802.11 standard; and
  an interface to send the A-MPDU frame for transmission as an IEEE 802.11 packet, and
  wherein the detection module detects that errors in IEEE 802.11ac transmission channel between the IEEE 802.11 compliant device and a second device exceed a threshold of tolerance, and responsive to the detection, switches away from a high throughput mode with A-MSDU and A-MPDU frame aggregation.

* * * * *